(12) United States Patent
Young (10) Patent No.: US 9,395,015 B2
(45) Date of Patent: Jul. 19, 2016

(54) ROTATABLE ACTUATOR SHAFT

(71) Applicant: Array Holdings, Inc., Houston, TX (US)

(72) Inventor: Terry Glenn Young, Longview, TX (US)

(73) Assignee: Safoco, Inc., Houston, TX (US)

( * ) Notice: Subject to any disclaimer, the term of this patent is extended or adjusted under 35 U.S.C. 154(b) by 6 days.

(21) Appl. No.: 13/648,348

(22) Filed: Oct. 10, 2012

(65) Prior Publication Data

US 2014/0097365 A1  Apr. 10, 2014

(51) Int. Cl.
*F16K 31/00* (2006.01)
*F16K 31/14* (2006.01)
*F16K 31/50* (2006.01)

(52) U.S. Cl.
CPC .............. *F16K 31/14* (2013.01); *F16K 31/50* (2013.01)

(58) Field of Classification Search
CPC ................................ F16K 31/14; F16K 31/50
USPC ............................................. 251/14, 77, 61.2
See application file for complete search history.

(56) References Cited

U.S. PATENT DOCUMENTS

| | | | |
|---|---|---|---|
| 29,322 A | 7/1860 | Saunders | |
| 2,010,194 A * | 8/1935 | McNeelan et al. | 137/637.2 |
| 3,608,912 A | 9/1971 | Templin | |
| 3,842,854 A * | 10/1974 | Wicke | 137/77 |
| 3,889,922 A * | 6/1975 | Peters | 251/14 |
| 3,896,835 A | 7/1975 | Wicke | |
| 4,129,283 A | 12/1978 | Taylor | |
| 4,135,547 A | 1/1979 | Akkerman et al. | |
| 4,157,167 A | 6/1979 | Akkerman | |
| 4,271,857 A | 6/1981 | Rowe | |
| 4,372,333 A | 2/1983 | Goans | |
| 4,568,058 A | 2/1986 | Shelton | |
| 4,585,207 A | 4/1986 | Shelton | |
| 4,619,434 A * | 10/1986 | Snyder et al. | 251/14 |
| 4,682,757 A | 7/1987 | Shelton | |
| 5,052,430 A * | 10/1991 | Trautwein | 137/315.35 |
| 5,067,510 A | 11/1991 | Breaux et al. | |
| 5,611,308 A * | 3/1997 | Hackett | 123/321 |
| 6,015,134 A | 1/2000 | Johnson | |
| 7,004,445 B2 * | 2/2006 | Lymberopoulos | 251/14 |
| 2003/0034465 A1 * | 2/2003 | Adams et al. | 251/14 |

OTHER PUBLICATIONS

Axelson, "Manumatic" Diaphragm Gate Valve Actuator, (dated 1985 according to opposing counsel in pending litigation).
W-K-M Surface Safety System; Cooper Industries; Flow Control; Catalog S, Issue 5, Copyright 1989; (pp. 1-24).
Cameron; Oil Tool Products 1970-1971; Automatic Safety Valve; (pp. 2); (Undated).
LCR Actuator; Operating Manual for Cameron LC ROCS-1 Actuators Which Meet ANSI/ASME SPPE-1 and API Specification 14D Requirements; Cameron Iron Works, Inc.; SD-1627; Mar. 1971; (pp. 1-21).

(Continued)

*Primary Examiner* — John K Fristoe, Jr.
*Assistant Examiner* — Umashankar Venkatesan
(74) *Attorney, Agent, or Firm* — Bushman Werner, P.C.

(57) ABSTRACT

Disclosed herein are apparatuses and methods of preventing rotational stress on the top shaft of valve actuators. Certain methods and apparatuses include a bifurcated top shaft. Other apparatuses and methods include a method of preventing rotational stress at the distal end on the top shaft of an actuator.

5 Claims, 5 Drawing Sheets

(56) References Cited

OTHER PUBLICATIONS

Description of Cameron Type "A" Fail-Safe Valve; Cooper Iron Works, Inc., Engineering Bulleting No. 170; Dec. 5, 1969; (pp. 1-7).
Baker CAC, Inc.; Bonnet Assembly; Unite No. 880-66/7341; Jun. 15, 1999; (pp. 1).
McEvoy-Willis; Surface Safety Valve (SSV) Hydraulic Actuator; Catalog No. 103-A; Feb. 1987; (pp. 8).
Cameron Oil Tool Division; Gate Valves; Cameron Iron Works, Inc. 1997; (pp. 7).
Cameron Iron Works, Inc.; LCR and HLCR Actuators and Accessories, 1986-1987 General Catalog; (pp. 2).
Cameron Iron Works, Inc.; Cameron Automatic Safety Valves; Cameron Oil Products 1972-1973; (pp. 3).
Cameron Iron works, Inc.; Cameron Gate Valve Products; (Undated); (pp. 1312-1342).
Gray Tool Company; Graysafe(TM) Hydraulic and Pneumatic Actuators, (Apr. 1981) 10m 10/820.
Axelson Incorporated; Condensed Catalog, (pp. ICC 0001417-ICC-0001442); pre 1982.

* cited by examiner

ROTATABLE ACTUATOR SHAFT

FIELD

The present invention pertains to valve actuators typically used in the oil and gas industry. More specifically, the present invention relates to an improved top shaft for prevention of torque damage.

BACKGROUND

Gate valves are generally comprised of a valve body having a central axis aligned with inlet and outlet passages, and a space between the inlet and outlet passages in which a slide, or gate, may be moved perpendicular to the central axis to open and close the valve. In the closed position, the gate surfaces typically seal against sealing rings which surround the fluid passage through the valve body. In the petroleum industry, gate valves are used along piping at various locations, and in particular are used in piping referred to in the petroleum industry as a Christmas tree, which is used as part of a drilling operation.

Gate valves may be operated manually or automatically. One method to automatically operate a gate valve is to use an actuator. An actuator is a mechanical device for moving or controlling a mechanism or system. When an actuator is used in a gate valve, the actuator is typically linked to a stem to repeatedly move the valve gate between open and closed positions.

Actuators to open and close the gate valves may include manual operators, diaphragm-type operators, and hydraulic operators. The actuator may include a bonnet assembly, which interconnects the valve body and the valve gate, and a bonnet stem which is movable with the gate via an operator.

A manual operator is often seen combined with diaphragm or hydraulic operator for back up purposes. These combinations generally result in a top shaft extending from the operator. The extension of the top shaft may indicate whether the valve is open or closed.

When using a manual operator with a diaphragm-type or hydraulic having a top shaft extending from the operator, care must be undertaken to ensure that torque is not applied to the top shaft. Torque applied to the top shaft may cause gate, gate seal, or drift misalignment. Additionally, excess torque of the top shaft may cause shearing of the top shaft or other damage to the internal components of the actuator.

It therefore may be desirable to have an actuator with a top stem having qualities of increased torque resistance.

SUMMARY

Certain embodiments of the present invention pertain to an actuator for moving a gate valve between open and closed valve positions within a valve body, the actuator comprising: an actuator housing with a distal end and a proximal end, the actuator housing comprising a pressurizeable chamber with an inlet port and an unpressurized chamber; a top shaft having a proximal end and a distal end, the proximal end operatively connected to a downstop and the distal end extending through a top plug at the distal end of the actuator housing, the top shaft further defining a shaft axis; a spring positioned between the downstop and a bonnet ring; an operator shaft having a proximal end and a distal end, the distal end operatively connected to the downstop and the proximal end extending through a bore of a bonnet and connected to a valve gate, the bonnet connected to the bonnet ring and the valve body; and wherein the top shaft bifurcated into a distal first stage top shaft and a proximal second stage top shaft at a junction, and wherein the first stage top shaft is capable of rotation in an axis perpendicular to the shaft axis upon contact with a rotational force.

In embodiments concerning the rotational force, in certain instances it is the result of a manual override of the actuator. In other embodiments, it is the result of an incorrect attempt to turn the top shaft by a worker, such as by a worker using a wrench in direct contact with the top shaft.

In certain embodiments concerning the junction of the first stage top shaft and the second stage top shaft, the junction may comprise an outward facing bearing groove extending proximally from a proximal end of the first stage top shaft and an inward facing bearing groove extending distally from a distal end of the second stage top shaft, and wherein the inward facing bearing groove is adapted to receive the outward facing bearing groove. Still further, the outward facing bearing groove and the inward facing groove may be aligned in an axis perpendicular to the shaft axis. In such embodiments, an O-ring may surround the outward facing groove. In other embodiments, a plurality of bearings may be between the inward facing groove and the outward facing groove. In some embodiments, the bearings or the O-ring are made of a compressible material.

In certain other embodiments concerning the junction, the junction may comprise an outward facing bearing groove extending proximally from a proximal end of the first stage top shaft and a top shaft nut surrounding the proximal end of the first stage top shaft wherein the top shaft nut is at least partially threaded on its inward side and adapted to receive an outwardly threaded proximal end of the second stage top shaft. Further, in certain embodiments, the top shaft nut may have a distal end comprising an inwardly angled lip with a proximal side about perpendicular to the shaft axis and at least partially surrounding the first stage top shaft. In further embodiments, wherein the top shaft nut has an inwardly angled lip, the first stage top shaft may itself have an outwardly angled lip with a distal side about perpendicular to the shaft axis, and wherein the distal side of the first stage top shaft lip is capable of abutting the proximal side of the lip of the top shaft nut. In such embodiments about perpendicular may mean from 90 degrees to approximately −45 degrees or +45 degrees.

Other embodiments of the invention disclosed herein pertain to a method of preventing or reducing torque upon the top shaft of a valve actuator during manual override operations, the method comprising: obtaining a valve actuator with a distal end having a top plug and a top shaft extending from the actuator distally through a bore within the top plug, the top shaft being bifurcated into a distal first stage top shaft and a proximal second stage top shaft, and wherein the first stage top shaft is capable of rotation in an axis perpendicular to the shaft axis upon contact with a rotational force; and installing a manual override turnwheel on the top plug and distal to the top shaft; rotating the manual override turnwheel to push the top shaft in a distal direction; and wherein the rotation of the manual override turnwheel allows for rotation of the first stage top shaft thereby preventing torque being applied to the second stage top shaft.

In such embodiments of the method, the bifurcation of the top shaft may comprise an outward facing bearing groove extending proximally from a proximal end of the first stage top shaft and an inward facing bearing groove extending distally from a distal end of the second stage top shaft, and wherein the inward facing bearing groove is adapted to receive the outward facing bearing groove.

In still further embodiments of the method, the bifurcation of the top may comprise an outward facing bearing groove extending proximally from a proximal end of the first stage top shaft and a top shaft nut surrounding the proximal end of the first stage top shaft wherein the top shaft nut is at least partially threaded on its inward side and adapted to receive an outwardly threaded proximal end of the second stage top shaft. Further the top shaft nut may have a distal end comprising an inwardly angled lip with a proximal side about perpendicular to the shaft axis and at least partially surrounding the first stage top shaft; and wherein the first stage top shaft has an outwardly angled lip with a distal side about perpendicular to the shaft axis, and wherein the distal side of the first stage top shaft lip is capable of abutting the proximal side of the lip of the top shaft nut.

In the aforementioned embodiments, the actuator may be a diaphragm, piston, pneumatic or hydraulic actuator.

BRIEF DESCRIPTION OF THE DRAWINGS

FIG. 2 is a cross sectional illustration of one embodiment of a two stage top shaft.

FIG. 3 is a cross sectional illustration of another embodiment of a two stage top shaft.

FIG. 5 is a cross sectional illustration of a manual override device.

LIST OF REFERENCE NUMERALS diaphragm actuator 1
top actuator housing 2
lower actuator housing 3
actuator bolts 4
inlet valve 5
pressure relief valve 6
upper plug 7
top shaft 8
seal retainer 9
rod wiper 10
top shaft seal 11
wear bearings 12
diaphragm retaining nut 13
diaphragm retainer plate 14
operator shaft 15
downstop 16
operator shaft threaded portion 17
first stage top shaft 18
second stage top shaft 19
proximal bearing support 20
outward bearing groove 21
top shaft trunnion 22
trunnion bore 23
inward bearing groove 24
proximal bearing support receiver 25
compressible bearings 26
hardened bearings 27
top shaft nut 28
top shaft nut lip 29
top shaft lip 30
top shaft nut threads 31
outward threaded portion 32
compressible material 33
outwardly threaded top plug 35
distal bearing 36
sleeve 37
turnwheel 38
turnwheel shaft 39
manual override bore 40

DETAILED DESCRIPTION

Introduction

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

Distal, in certain instances, can be defined as toward the top of the actuator and away from any valve on which the actuator rests.

Proximal, in certain instances, can be defined as toward a valve on which an actuator is mounted and away from the top of the actuator.

Outward or outwardly, in certain instances, can be defined as away from a central axis in a direction substantially perpendicular to such a central axis.

As used herein, the term "conduit" means and refers to a fluid flow path.

As used herein, the term "line" means and refers to a fluid flow path.

As used herein, the term "fluid" refers to a non-solid material such as a gas, a liquid or a colloidal suspension capable of being transported through a pipe, line or conduit. Examples of fluids include by way of non-limiting examples the following: natural gas, propane, butane, gasoline, crude oil, mud, water, nitrogen, sulfuric acid and the like.

As used herein, the term "attached," or any conjugation thereof describes and refers to the at least partial connection of two items.

Embodiments

In many of the embodiments herein, the figures may refer to a diaphragm actuator. However, in certain other embodiments, the actuator is a pneumatic actuator or a hydraulic actuator. Additionally, in certain embodiments, the actuator is a mechanical actuator.

It is an object of the embodiments disclosed herein to reduce torque and rotational pressure upon the top shaft of an actuator.

It is a further object of the embodiments of the invention to provide a top shaft that is bifurcated to avoid damage through accidental or inadvertent rotation of the top shaft during the use of a manual override device.

It is a further object of the embodiments of the invention disclosed herein to provide a method of joining a distal first stage of a bifurcated top shaft of an actuator to a proximally located second stage of a bifurcated top shaft of an actuator which allows rotation in an axis perpendicular to the shaft axis. In such embodiments, the method may comprise obtaining a first stage portion of a top shaft, distally located from a second stage potion of a top shaft, the proximal end of the first stage comprising, from a distal position to a proximal position the following: a trunnion, an outward bearing groove, and a proximal bearing support. The method may further comprise obtaining a second stage portion of a top shaft, proximally located from the aforementioned first stage portion of the top shaft. In such embodiments, the distal end of the second stage comprising, from a distal position to a proximal position, the following: a tunnion bore, an inward bearing groove and a proximal bearing support receiver. Further, the method may comprise a compressible bearing between the inward bearing groove and the outward bearing groove. Alternatively, the method may comprise a compressible O-ring surrounding the outward bearing groove.

In further methods of providing a method of joining a distal first stage of a bifurcated top shaft of an actuator to a proximally located second stage of a bifurcated top shaft of an actuator which allows rotation in an axis perpendicular to the shaft axis, the bearings are hardened bearings made of an incompressible material such as a ceramic, a steel, tungsten, aluminum, a hard mineral and the like. In such embodiments, in lieu of compressible bearings, a top shaft nut comprising a top shaft nut lip at its distal end and a threaded inward portion capable of being received by a threaded outward portion of a second stage top shaft stem may be used. In such embodiments, a hardened bearing may be located between an inner wall of the top shaft nut and the outward bearing groove. In certain embodiments, the top shaft nut lip helps to encase grease or other lubricants at the interface between the first stage top shaft and the second stage top shaft. In certain other embodiments, the top shaft lip nut acts as a seal to help encase grease or other lubricants at the interface between the first stage top shaft and the second stage top shaft. In still other embodiments, the proximal side of the top shaft nut lip nut interacts with the distal side of a first stage top shaft lip to impede or inhibit proximal movement of the top shaft nut upon reaching a desired threading interaction between the inward facing wall of the top shaft nut and the threaded outer wall of the distal end of the second stage top shaft.

Still further, joining a bifurcated top shaft may include a second stage top shaft with a compressible inward bearing groove. In such embodiments, the inward bearing groove may be In still other embodiments, in lieu of a bifurcated top shaft, the most distal portion of the top shaft possesses a torque prevention device such as one or more bearings.

Figure 1:
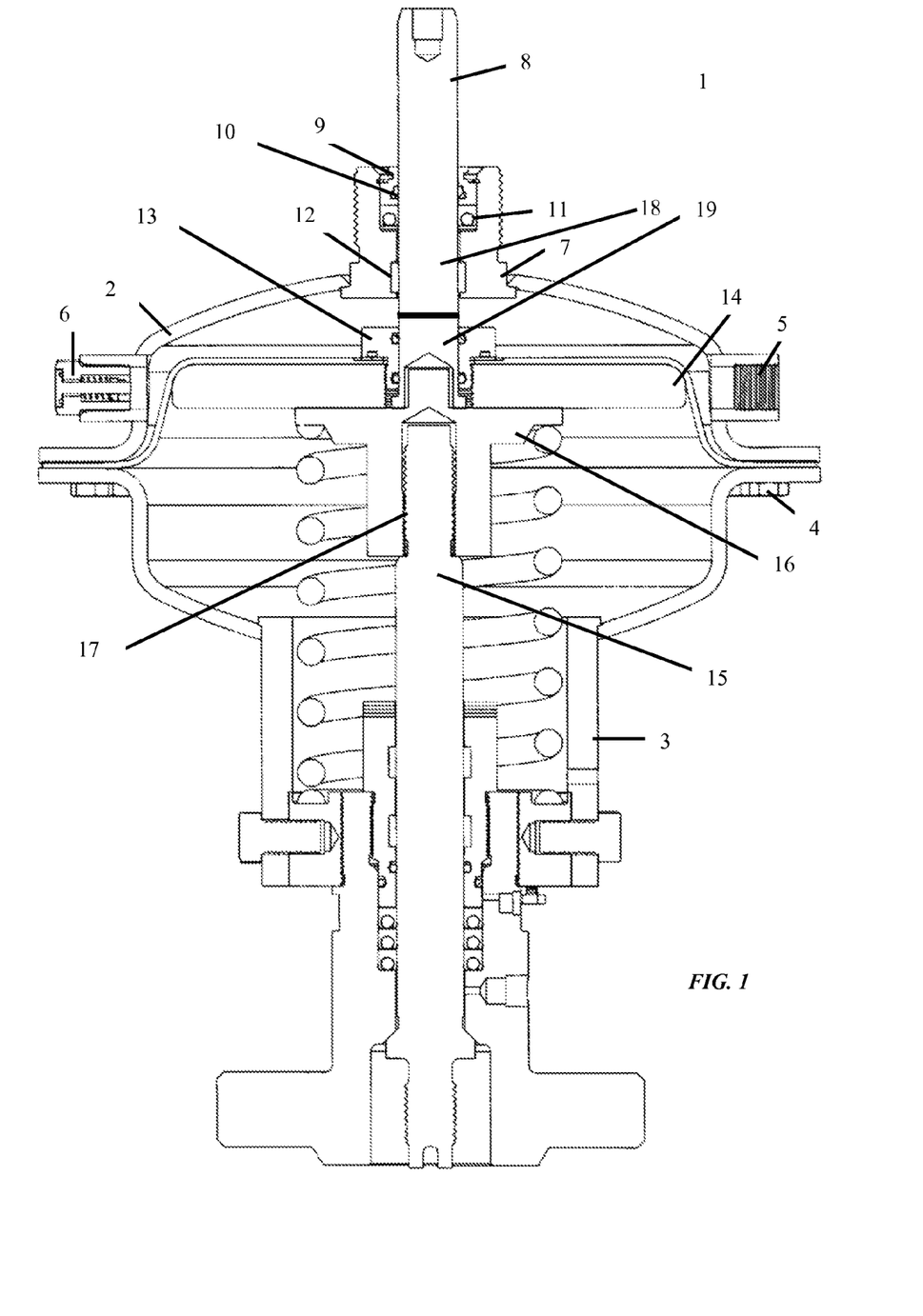
FIG. 1 is a cross sectional illustration of a diaphragm actuator.

Referring now to the drawings, and more particularly FIG. 1, a diaphragm actuator 1 is shown in the present invention. The actuator has a top actuator housing 2 and a lower actuator housing 3. The top actuator housing is distal to the lower actuator housing and is bolted to the distal end of the lower actuator housing via a series of actuator bolts 4. Further, the top actuator housing 2 has a port for increasing or decreasing pressure hereafter referred to as an inlet valve 5. The top actuator housing further comprises a pressure relief valve 6. At the distal end of the top actuator housing 2 is an upper plug 7 which is welded, cast, forged or screwed into the top actuator housing. The upper plug 7 has an internal bore for receiving a top shaft 8. Between the inner bore of the upper plug and the top shaft is a seal retainer 9 and a rod wiper 10. Proximal to the seal retainer and seal is a top shaft seal 11, which, in certain embodiments may be a Polypack$^{TM}$ seal. Proximal to the top shaft seal are wear bearings 12 which at least partially surround the top shaft 8. The seal retainer 9, the rod wiper 10 and the wear bearings 12 are preferably non-metallic to eliminate close tolerance problems which may be associated with the actuator top shaft. These components may be made of hard plastic like materials such as delrin, nylon, thermoplastics, resins, polyurethanes, phenolics, acetals, polyacrylates, epoxides, polycarbonates, polyester, aramids and the like.

The top shaft 8 fits through the upper plug 7 of the top actuator housing 2. The top shaft has a proximal end pointed away from the diaphragm and a distal end pointed toward the diaphragm. Further, the top shaft is preferably formed from stainless steel. The top shaft 8 is preferably large enough in diameter to prevent bucking stresses when loaded by a manual override or a hydraulic override. The proximal end of the top shaft passes through the diaphragm retaining nut 13, through the diaphragm retainer plate 14 and interacts with the operator shaft.

In a typical configuration, the top shaft 8 does not rotate. With this design, manual or hydraulic overrides have the potential to provide torque requirements that can injure parts of the valve when misused. For example, if a manual override grips and turns the top shaft.

Further, in typical configurations the top shaft is between one and three inches with a top shaft length of between 6 and 30 inches. As the top shaft 8 protrudes from the upper plug 7, the top shaft 8 can extend from the upper plug 7 to indicate whether a valve gate is in the opened position or the closed position.

Still referring to FIG. 1, the operator shaft 15, which possesses a proximal end toward a valve body and a distal end is threaded into and through the central axis of a downstop 16, such that it extends past the distal edge of the downstop 16. Preferably, this operator shaft threaded portion 17 is less than the inner diameter of the downstop 16. The threading within the central bore of the downstop 16 preferably will extend from the proximal end of the central bore to the distal end of the central bore. The portion of the operator shaft 15 which is screwed into the downstop 16 may comprise reciprocal threading the length of which may be the same as the length of threading of the central bore of the downstop 16.

In alternative embodiments, the distal end of the operator shaft 15 is affixed to the downstop via welding, casting, forging, pinning and the like.

Still referring to FIG. 1, there is an improvement to the top shaft 8 such that the top shaft is bifurcated into a first stage top shaft 18 and a second stage top shaft 19.

Figure 2A:
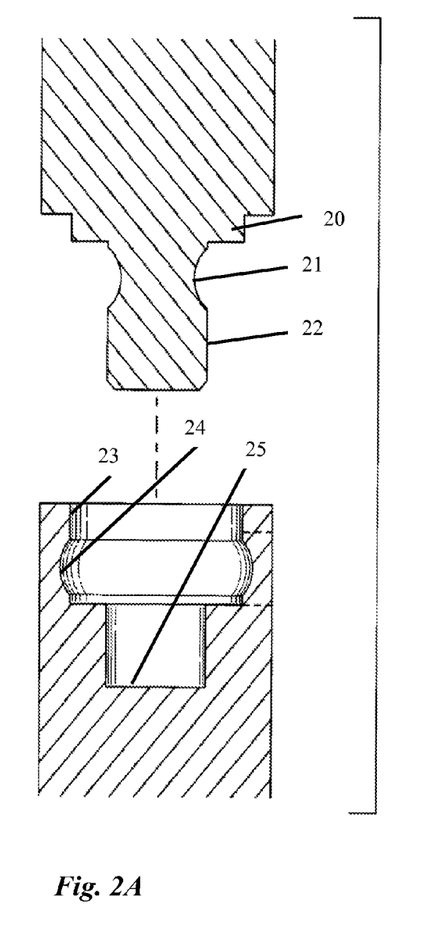
FIG. 2A illustrates the two stages separated.

As can be more easily seen in FIG. 2A, the first stage top shaft 18, in this particular configuration is distal to the second stage top shaft 19. Further, the first stage top shaft 18 may be made of a typical top shaft material such as stainless steel, tungsten, titanium, aluminum and the like. The first stage top shaft 18, according to FIG. 2A, comprises from its proximal end, a proximal bearing support 20. Immediately distal to the proximal bearing support is the outward bearing groove 21, into which fits at least one bearing. Immediately distal to the outward bearing groove 21 is the distal bearing retainer, which prevents upward or distal movement of a bearing. Immediately distal to the distal bearing retainer is the top shaft trunnion 22, which is adapted to be accepted by the trunnion bore 23 located at the distal end of the second stage top shaft 19.

Immediately proximal to the trunnion bore 23 on the second stage top shaft is an inward bearing groove 24 into fits at least one bearing. Proximal to the inward bearing groove 24 is the proximal bearing support receiver 25, which is adapted to receive the proximal bearing support 20.

Figure 2B:
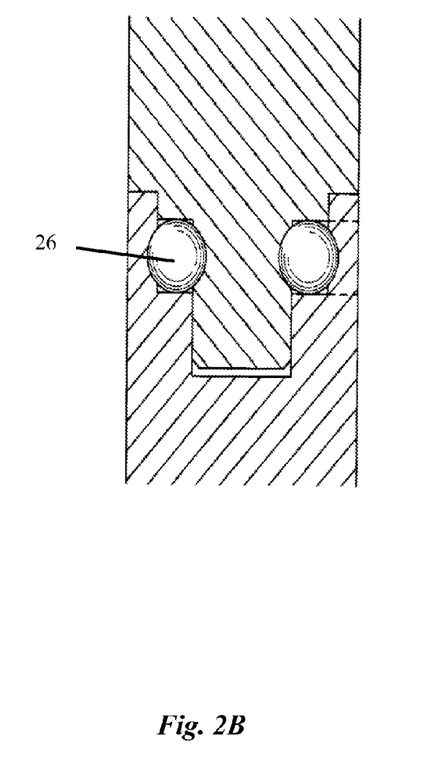
FIG. 2B illustrates the two stages joined.

The bearing or bearings used the embodiments of the invention as illustrated by FIG. 2B, may be in the form of a plurality of spherical structures. In certain instances, the bearings 26 as shown in FIG. 2B are of compressible material such that the proximal bearing support 20 may pass the compressible bearings 26 and be received by the proximal bearing support receiver 25. Compressible material may include delrin, nylon, thermoplastics, resins, polyurethanes, phenolics, acetals, polyacrylates, epoxides, polycarbonates, polyester, aramids and the like.

In an alternative embodiment, in lieu of a plurality of compressible bearings 26 is an O-ring like structure which surrounds the outward bearing groove 21 and is seated between the outward bearing groove 21 and the inward bearing groove 24. Like the bearings in the form of a plurality of spherical structures, the O-ring can be made off a compressible material such that the proximal bearing support 20 may pass the O-ring and be received by the proximal bearing support receiver 25.

Figure 3A:
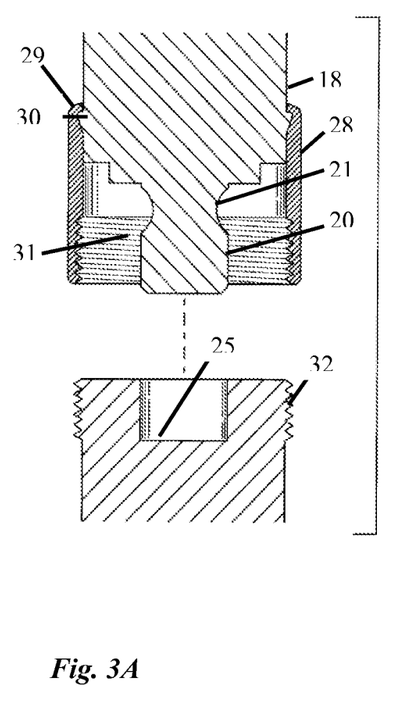
FIG. 3A illustrates two stages separated.

In still another embodiment, as illustrated in FIG. 3A, hardened bearings 27 (not shown) may be used in lieu of compressible bearings or a hardened ring may be used in lieu of an O-ring. In such embodiments, there are several methods by which spherical hardened bearings 27 may abut and partially fit within the outward bearing groove 21 such that proximal bearing support 20 is still received by the proximal bearing support receiver 25. In FIG. 3A, in lieu of an inward bearing groove 24 is a top shaft nut 28 which surrounds the first stage top shaft 18. The top shaft nut, at its distal end has a top shaft nut lip 29 which can abut the distal side of a top shaft lip 30 which at least partially surrounds the first stage top shaft in an axis perpendicular to the shaft axis when present to restrict proximal movement of the top shaft nut. The inward side of the top shaft nut 28 may possess top shaft nut threads 31 which are adapted to be received by an outward threaded portion 32 of the second stage top shaft 19. Thus, the inward wall and the outward bearing groove 21 retain hardened bearings 27 (not shown), while allowing full rotation of the first stage top shaft 18 against the second stage top shaft 19, the rotational axis being perpendicular to the shaft axis.

Figure 3B:
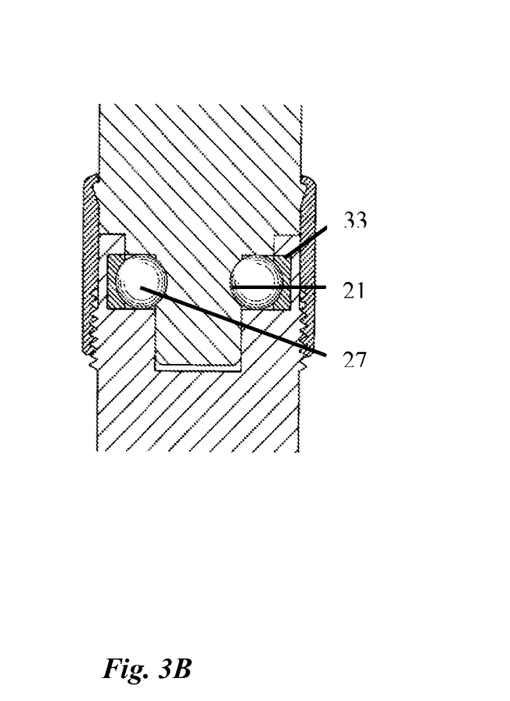
FIG. 3B illustrates two stages joined.

In still another embodiment, as illustrated in FIG. 3B, in lieu of a top shaft nut 28, the inward bearing groove 24 possesses a compressible ring 33 which, along with the outward bearing groove 21, retains the hardened bearings 27. The compressible ring may in certain embodiments, comprise a compressible material such as delrin, nylon, thermoplastics, resins, polyurethanes, phenolics, acetals, polyacrylates, epoxides, polycarbonates, polyester, aramids and the like. Alternatively, the compressible ring may be a spring like device such as retainer spring 34, which is capable of being positioned outwardly to the hardened bearings 27.

Figure 4:
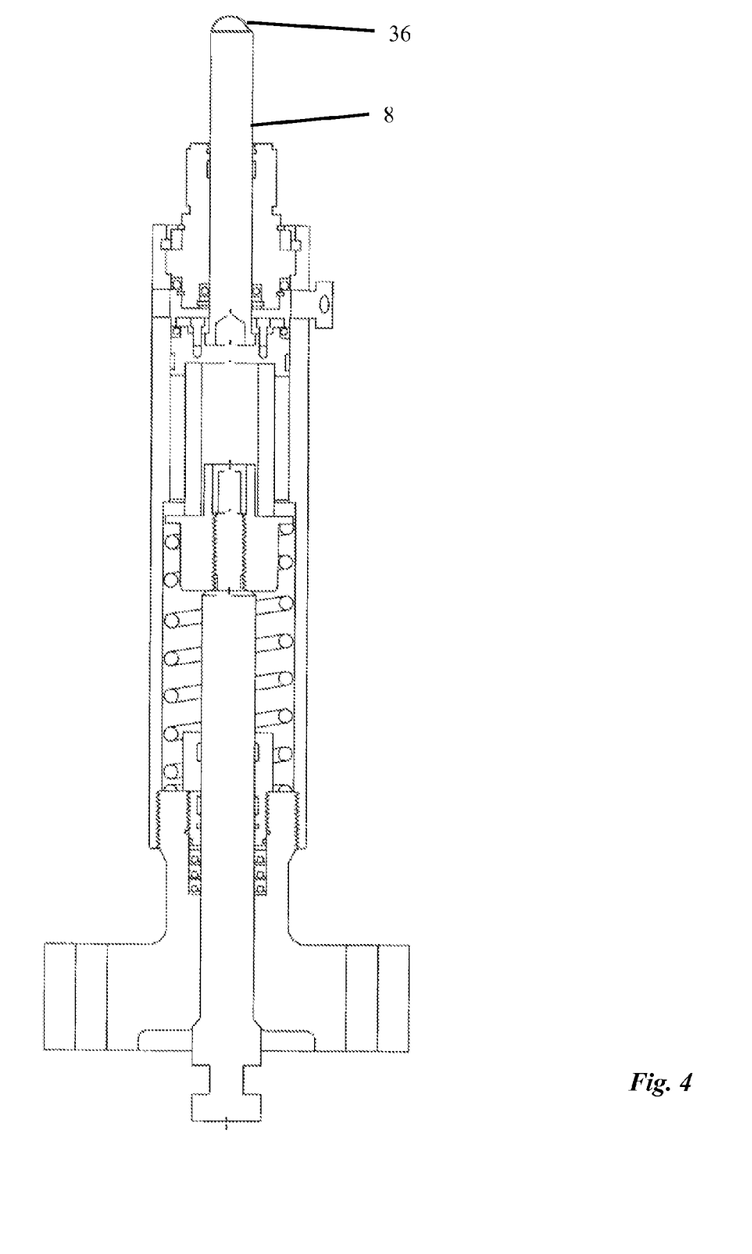
FIG. 4 is a cross sectional illustration of another embodiment of a rotational top shaft in a pneumatic actuator.
Figure 5A:
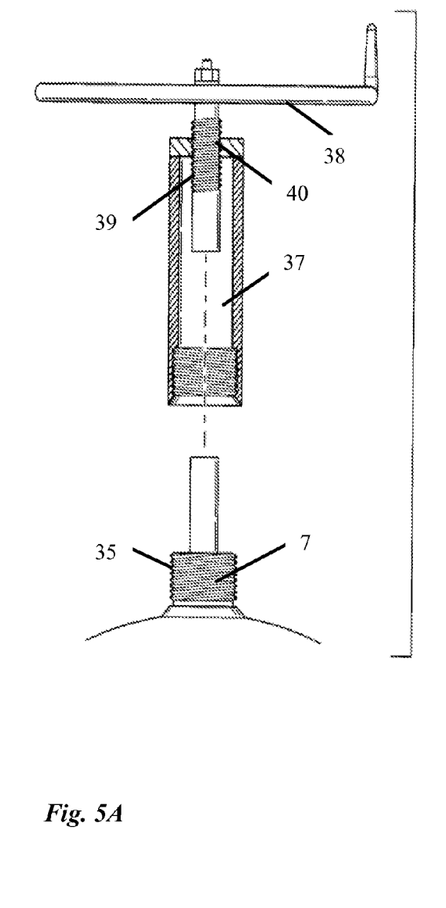
FIG. 5A illustrates the manual override device depicting the threads of the upper plug on which the manual override device is affixed.
Figure 5B:
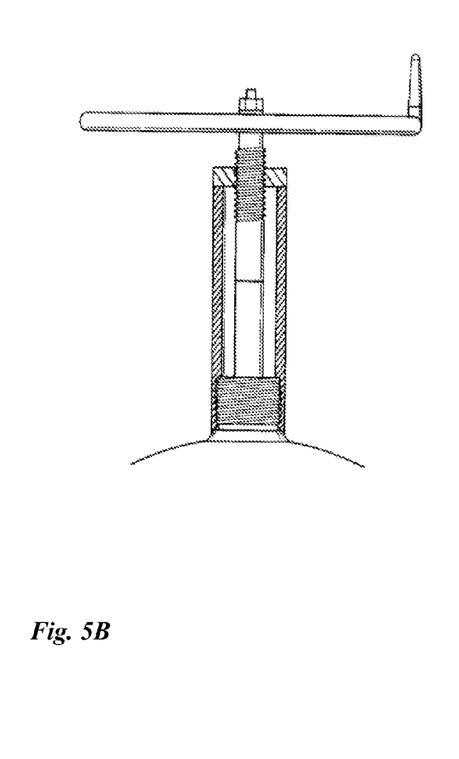
FIG. 5B illustrates the manual override device affixed to the upper plug.

Referring to FIG. 4, a cross sectional illustration of a top shaft 8 in a piston actuator is provided. However, unlike the previous examples of a bifurcated top shaft, FIG. 4 provides a configuration of an alternate one piece top shaft wherein the distal end which interacts with the manual override. In the aforementioned configuration, a distal bearing 36 interacts with the proximal end of the manual override such that rotation of the top shaft is prevented. However, the aforementioned first stage top shaft and second stage top shaft may be used additively or in the alternative in actuators possessing a top shaft extending distally from a top plug Referring to FIG. 5A is an illustration of a manual override device that may be threaded onto the outside of an upper plug 7 of a diaphragm actuator, a pneumatic actuator or a hydraulic actuator. A typical manual override comprises a sleeve 37 with a threaded inward side capable of being retained by the threaded outward side of the upper plug upon rotating the sleeve 37 onto the upper plug. The outwardly threaded top plug 35 is adapted to receive the manual override with a threaded interior wall. In such embodiments, the proximal end of the sleeve is fitted to the upper plug 7 and rotated until the sleeve 37 is retained. In many applications, the typical manual override has a turnwheel 38 at the distal end of the sleeve. Additionally, the turnwheel has a threaded turnwheel shaft 39 capable of being received by a manual override bore 40 at the distal end of the sleeve 36. The turnwheel can be turned in a direction such that the turnwheel shaft 39 moves in a proximal direction and presses on the top shaft 8. The rotation of the turnwheel shaft 39 can transfer rotational force to the top shaft 8, which may cause damage. This can be prevented by a distal bearing at the distal end of a unibody top shaft or through the aforementioned use of a first stage top shaft and a second stage top shaft. FIG. 5B is an illustration of the manual override attached to the upper plug of an actuator.

Although the foregoing examples have involved a top shaft, it is conceivable that in some embodiments of the invention, these configurations may be used on an operator shaft of an actuator. It should be appreciated by those of skill in the art that the techniques disclosed here which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit or scope of the invention.

The invention claimed is:

1. An actuator for moving a gate valve between open and closed valve positions within a valve body, the actuator comprising:
   a. an actuator housing with a distal end and a proximal end, the actuator housing comprising a pressurizable chamber with an inlet port and an unpressurized chamber;
   b. a top shaft having a proximal end and a distal end, the proximal end operatively connected to a downstop and the distal end extending through a top plug at the distal end of the actuator housing, the top shaft further defining a shaft axis;
   c. a spring positioned between the downstop and a bonnet ring;
   d. an operator shaft having a proximal end and a distal end, the distal end operatively connected to the downstop and the proximal end extending through a bore of a bonnet and connected to a valve gate, the bonnet connected to the bonnet ring and the valve body; and
   wherein the top shaft bifurcated into a distal first stage top shaft and a proximal second stage top shaft at a junction, wherein the junction comprises a radially outwardly facing being groove extending proximally form a proximal end of the first stage top shaft and a radially inwardly facing bearing groove extending distally from a distal end of the second stage top shaft, and wherein the radially inwardly facing bearing groove and the radially outwardly facing bearing groove are in register to form an annular bearing race, there being a plurality of compressible bearings in said race, and wherein the first stage top shaft is configured to rotate in an axis perpendicular to the shaft axis upon contact with a rotational force.

2. The actuator of claim 1, wherein rotational force is applied by manual override.

3. The actuator of claim 1, wherein the junction comprises an outward facing bearing groove extending proximally from a proximal end of the first stage top shaft and a top shaft nut surrounding the proximal end of the first stage top shaft wherein the top shaft nut is at least partially threaded on its inward side and adapted to receive an outwardly threaded proximal end of the second stage top shaft.

4. The actuator of claim 3, wherein the top shaft nut has a distal end comprising an inwardly angled lip with a proximal side about perpendicular to the shaft axis and at least partially surrounding the first stage top shaft.

5. The actuator of claim 4, wherein the first stage top shaft has an outwardly angled lip with a distal side about perpendicular to the shaft axis, and wherein the distal side of the first stage top shaft lip is capable of abutting the proximal side of the lip of the top shaft nut.

\* \* \* \* \*

UNITED STATES PATENT AND TRADEMARK OFFICE
CERTIFICATE OF CORRECTION

PATENT NO. : 9,395,015 B2  
APPLICATION NO. : 13/648348  
DATED : July 19, 2016  
INVENTOR(S) : Terry Glenn Young Page 1 of 1

It is certified that error appears in the above-identified patent and that said Letters Patent is hereby corrected as shown below:

In the claims:

At column 8, line 60 please replace "being" with --bearing--.

At column 8, line 60 please replace "form" with --from--.

Signed and Sealed this
Twenty-third Day of August, 2016

Michelle K. Lee
*Director of the United States Patent and Trademark Office*